(12) United States Patent
Kume

(10) Patent No.: US 6,859,935 B2
(45) Date of Patent: Feb. 22, 2005

(54) DISK APPARATUS WITH CHUCKING MECHANISM

(75) Inventor: Hideki Kume, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 142 days.

(21) Appl. No.: 10/349,916

(22) Filed: Jan. 24, 2003

(65) Prior Publication Data

US 2003/0142611 A1 Jul. 31, 2003

(30) Foreign Application Priority Data

Jan. 29, 2002 (JP) .................................. P2002-019432

(51) Int. Cl.[7] .......................... G11B 7/08; G11B 7/085; G11B 7/09
(52) U.S. Cl. ..................................................... 720/694
(58) Field of Search ............................... 720/694, 688, 720/698, 692; 369/263.1, 248, 247.1, 75.21

(56) References Cited

U.S. PATENT DOCUMENTS 6,349,084 B1 * 2/2002 Ariyoshi .................. 369/263.1

FOREIGN PATENT DOCUMENTS

| JP | 6-11142 U | 2/1994 |
|---|---|---|
| JP | 10-241335 | 9/1998 |

* cited by examiner

*Primary Examiner*—Julie Anne Watko
(74) *Attorney, Agent, or Firm*—Morgan Lewis & Bockius LLP

(57) ABSTRACT

A disk apparatus has a chucking mechanism including a receiving member and a disk pressing member respectively provided in an upper position and a lower position with respect to a disk tray. One longitudinal end portion of a drive chassis on which the disk pressing member is disposed is attached to a frame via first buffer members. A free end of the drive chassis is joined to a movable member, which is moved up and down as the movable member is guided by a guide hole of a guide plate provided in a position opposed to the free end of the drive chassis, via a second buffer member made of vibration-proof rubber. The movable member is formed of a hollow cylindrical shaft member, and a second buffer member is interposed in a press fitted state between the shaft member and the free end of the drive chassis.

5 Claims, 5 Drawing Sheets

DISK APPARATUS WITH CHUCKING MECHANISM

The present disclosure relates to the subject matter contained in Japanese Patent Application No. 2002-019432 filed Jan. 29, 2002, which is incorporated herein by reference in its entirety.

BACKGROUND OF THE INVENTION

1. Field of the Invention

The present invention relates to a disk apparatus, particularly to a disk apparatus in which a disk set on a disk tray and carried in to a disk setting position is grasped by a chucking mechanism.

2. Description of the Related Art

FIG. 7 is a perspective exploded view showing a drive chassis 3, a movable member 5, a cam plate 6 and so forth used in a related art disk apparatus, and FIG. 8 is a schematic bottom view illustrating a portion of the related art disk apparatus.

Referring to FIG. 8, a reference numeral 1 denotes a frame formed in a rectangular shape. A disk tray 2 can be moved in the direction (longitudinal direction) shown by an arrow A along which the disk tray 2 is carried in to and carried out from the frame 1. The disk tray 2 is provided on an upper surface thereof with a recessed portion (not shown) in which a circular disk is to be placed. A disk placed in the recessed portion is carried in to and carried out from a disk setting position that is substantially a central portion of the frame 1 in accordance with a movement of the disk tray 2 in the direction of the arrow A.

A drive chassis 3 provided with a disk scanning optical pickup 4 capable of being moved forward and backward in the longitudinal direction is attached to the frame 1. The drive chassis 3 is attached at one section of one longitudinal end portion 31 thereof to the frame 1 so that the drive chassis 3 can be swung vertically at a free end 32 thereof, which is on the opposite side of the end portion 31, around an attaching portion X serving as a fulcrum. The drive chassis 3 is provided at the side of the free end 32 thereof with a movable member 5 made of a lift lever formed substantially in the shape of the letter "C" in plan view. Support shafts 52, 52 provided on left and right arms 51, 51 of the movable member 5 are supported pivotably on bearings 12, 12 provided on the portions of the frame 1 which are opposed to left and right side portions of the drive chassis 3. The free end 32 of the drive chassis 3 is joined to the movable member 5. Two widthwise end portions of the free end 32 is attached to the movable member 5 in a relatively swingable manner. The portion of the movable member at which the free end 32 of the drive chassis 3 is joined to the movable member 5 are shown by reference letters Y.

A cam plate 6 is attached to a front plate 13 of the frame 1 in a relatively slidable manner in the lateral direction W, and a projecting shaft 33 provided on the movable member 5 is engaged slidably with a cam hole 61 made in the cam plate 6. When the cam plate 6 is slid in the lateral direction W, the movable member 5 is moved up and down around the support shafts 52, 52 with the projecting shaft 33 which is moved up and down around the support shafts 52, 52 as the projecting shaft 33 is guided by the cam hole 61. Through such upward and downward movements of the movable member 5, the drive chassis 3 is swung at the free end 32 in the vertical direction around the attaching section X of the first-mentioned longitudinal end portion 31.

The purpose of swinging the drive chassis 3 at the free end 32 in the vertical direction in the disk apparatus of this construction is to lift from the disk tray 2 the disk carried in to a disk setting position by the disk tray 2, and have the disk grasped by a chucking mechanism (not shown). The disk thus grasped by the chucking mechanism is rotated with the chucking mechanism. A scanning operation is carried out with the optical pickup 4 moved radially with respect to the rotating disk. The chucking mechanism includes a receiving member attached rotatably to an upper surface side of the frame 1, and a disk pressing member adapted to lift the disk. The disk pressing member is disposed on the disk tray 2, and press the disk from the disk set position against the receiving member. The disk pressing member is a turntable attached rotatably to the drive chassis 3. The disk tray 2 is provided with an opening which allows the passage of the disk pressing member during a disk chucking operation. A reference numeral 34 denotes a motor used to rotationally drive a turntable as the disk pressing member, and a reference numeral 35 denotes a motor used to reciprocatingly move the optical pickup, these motors being provided on the drive chassis 3.

In order to prevent in this kind of disk apparatus an impact from being transmitted from the frame 1 and movable member 5 to the drive chassis 3 provided with the optical pickup 4, a first buffer member 71 is provided in a position X at which the drive chassis 3 is joined to the frame 1, and second buffer members 72, 72 are provided in positions Y, Y at which the drive chassis 3 is joined to the movable member 5. This arrangement will further be described with reference to FIG. 7

As shown in FIG. 7, the first buffer member 71 and second buffer members 72 are made of cylindrical members 7 of soft vibration-proof rubber provided with an annular groove 7a in axially intermediate portions thereof. The first buffer member 71 is supported on the drive chassis 3 by fitting the buffer member 71 at the annular groove 7a in a non-closed hole 36 formed in the end portion 31 of the drive chassis 3, and a fixing screw 7 inserted from the lower side of the first buffer member 71 thereinto is driven into a threaded hole (not shown) of the frame 1 shown in FIG. 8. When the end portion 31 of the drive chassis 3 is thus attached to the frame 1, the free end 32 of the drive chassis 3 becomes swingable through the deformation of the first buffer member 71 around a one-dot chain line X' with the attaching portion X used as a fulcrum. The second buffer members 72 are supported on the drive chassis 3 by fitting the buffer members 72 at their annular grooves 7a in non-closed holes 37 formed in the free end 32 of the drive chassis 3, and fixing screws 74 inserted from the lower side of the second buffer members 72 thereinto are driven into threaded holes (not shown) of the movable member 5 shown in FIG. 8. When the drive chassis 3 is thus attached at the free end 32 to the movable member 5, the free end 32 of the drive chassis 3 and the movable member 5 become relatively swingable through the deformation of the second buffer members 72. Moreover, an impact occurring in the frame 1 and movable member 5 is absorbed in the first buffer member 71 and second buffer members 72, and rarely transmitted to the drive chassis 3.

In the related art disk apparatus shown in FIG. 8, the motor M used for inserting and withdrawing the disk tray 2 into and from the frame 1 is provided in a substantially central section of a front portion of the frame 1. A rotational movement of this motor M is transmitted to a rack 21, which is provided on the disk tray 2, via a gear train (not shown), and converted into a linear movement. The rack 21 is provided in an offset position on one side of the opening of the disk tray 2.

JP-U-6-11142 includes a description of a disk chucking mechanism provided in a disk player. In this disk chucking mechanism, faults thereof, etc. which cause troubles, are eliminated by elaborating the shape of a cam hole.

In the related art disk apparatus described with reference to FIG. 7 and FIG. 8, the free end 32 of the drive chassis 3 is joined to the movable member 5, the vertical movements of which are controlled by the cam hole 61 of the cam plate 6, via the second buffer members 72. This enables the free end 32 of the drive chassis 3 to be swung through a pivotal movement or a vertical movement of the movable member 5. The left and right arms 51, 51 of the movable member 5 are provided on the left and right sides of the free end 32 of the drive chassis 3. Therefore, the movable member 5 comes to have large dimensions, so that the cost of manufacturing this part increases correspondingly. Since the left and right arms 51, 51 of the movable member 5 are provided in left and right spaces of the free end 32 of the drive chassis 3, the motor M as a driving power source for inserting and withdrawing the disk tray 2 into and from the frame 1 cannot be provided in these spaces. Therefore, the motor M need to be provided in the substantially central section of the front portion of the frame 1 as mentioned above. As a result, it became difficult to simplify the structure of the gear train by reducing a distance between the motor M and rack 21.

SUMMARY OF THE INVENTION

An object of the present invention is to provide a disk apparatus in which the dimensions of a movable member for swinging a drive chassis at a free end thereof are reduced as compared with those of a movable member of a related art disk apparatus, and thereby securing hollow spaces on the left and right sides of the drive chassis, enabling a motor as a driving power source for inserting and withdrawing a disk tray into and from a frame to be installed in one of these hollow spaces.

Another object of the present invention is to provide a disk apparatus in which an impact imparted to a frame and a movable member is hardly transmitted to the drive chassis so as to prevent the scanning performance of an optical pickup provided on the drive chassis from deteriorating.

According to an aspect of the invention, there is provided a disk apparatus comprising: a frame; a disk tray adapted to be driven by a motor and carried into and out from the frame; a chucking mechanism adapted to grasp a disk carried into the frame by the disk tray, the chucking mechanism having a disk receiving member and a disk pressing member adapted to lift the disk set on the disk tray and press the disk against the receiving member; a first buffer member; a drive chassis disposed below the disk tray, the drive chassis having one end attached to the frame via the first buffer member and another end being swingable in vertical directions around the one end serving as a fulcrum; a cam plate having a com groove, the cam plate being movable in lateral directions at a position facing the another end; a second buffer member; and a movable member attached to the another end via the second buffer member, the movable member adapted to be moved vertically as the movable member is guided along the cam groove, wherein the disk pressing member is disposed on the drive chassis, and the movable member has a substantially shaft shape projecting from the another end of the drive chassis and engaged slidably with the cam groove.

When the movable member guided into the cam groove through a lateral movement of the cam plate in the disk apparatus thus constructed is vertically moved, the drive chassis joined to the movable member is swung at the free end thereof around the other end portion thereof as a fulcrum with the movable member. When the drive chassis is swung up, the disk pressing member of the chucking mechanism lifts the disk on the disk tray and presses the disk against the receiving member, so that the disk is grasped. When the drive chassis is swung down, the disk grasping condition of the chucking mechanism is released.

In the present invention, the movable member may be made of a shaft element projectingly attached to a portion of the free end of the drive chassis and engaged slidably with the cam groove. Therefore, the movable member is miniaturized remarkably as compared with the lift lever type movable member 5 shown in FIG. 7 and FIG. 8. This enables a structure for swinging the drive chassis at the free end thereof to be simplified greatly as compared with that in a related art disk apparatus of this kind. Moreover, hollow spaces come to be secured on both the left and right sides of the drive chassis owing to such miniaturization of the movable member, so that the motor as a driving power source for inserting and withdrawing the disk tray into and from the frame can be installed by utilizing the hollow spaces. Since an impact imparted to the frame and movable member is absorbed in the first and second buffer members, the impact is hardly transmitted to the drive chassis.

According to the present invention, it is preferable that the shaft element be formed to a hollow cylindrical shape and fitted around a projection extending from the free end of the drive chassis, that the second cylindrical buffer member fitted around the projection be interposed between the shaft element and projection, and that the shaft element be supported in a non-contacting state with respect to the projection and the free end of the drive chassis on the projection. According to this structure, the shaft element can be joined to the drive shaft by only fitting the shaft element, which forms the movable member, around the projection on the side of the drive chassis via the second buffer member. Therefore, the shaft element is joined to the drive chassis without using additional parts, such as fixing screws.

According to the present invention, it is preferable that the first-mentioned longitudinal end portion of the drive chassis be attached at both of two widthwise end portions thereof to the frame via the first buffer members, and that the frame be provided with a vertically extending guide which assists a vertical movement of the shaft element as the shaft element is guided by the cam groove of the cam plate. According to this arrangement, the drive chassis is attached at two sections of the first-mentioned longitudinal end portion thereof to the frame, and the vertical movements of the shaft element are assisted owing to the guide. This enables the drive chassis to be swung at the free end thereof vertically with a high accuracy without causing the drive chassis to vibrate laterally.

According to the present invention, it is desirable that the disk tray be provided in an offset position thereon at one side of the opening which allows the passage of the disk pressing member of the chucking mechanism with a rack which is meshed with a gear rotationally driven by the motor, and which thereby moves the disk tray along a direction in which the disk is carried in to and carried out from the disk setting position, and that the motor be provided on the portion of the frame which is opposed to the side portion of the drive chassis which corresponds to the position on the disk tray in which the rack is provided. This enables a distance between the motor and rack to be short and thereby simplifying a gear train for transmitting a rotation of the motor to the rack.

The disk apparatus according to the present invention can be embodied by employing a structure comprising: a frame having a guide; a motor; a disk tray adapted to be driven by the motor and carried into and out from the frame, the disk tray having an opening and a rack disposed on one side of the opening and meshed with a gear driven by the motor; a chucking mechanism adapted to grasp a disk carried into the frame by the disk tray, the chucking mechanism having a disk receiving member and a disk pressing member adapted to lift the disk set on the disk tray and press the disk against the receiving member; first buffer members made of vibration-proof rubber; a drive chassis disposed below the disk tray, the drive chassis having one end attached to the frame via the first buffer members and another end being swingable in vertical directions around the one end serving as a fulcrum, the drive chassis having a projection projecting from the another end; a disk scanning optical pickup disposed on the drive chassis; a cam plate having a com groove, the cam plate being movable in lateral directions at a position facing the another end; a second buffer member made of vibration-proof rubber and pressingly fit on the projection of the drive chassis; and a movable member attached to the another end via the second buffer member, the movable member adapted to be moved vertically as the movable member is guided along the cam groove, wherein the disk pressing member is disposed on the drive chassis and is passable the opening of the disk tray, the movable member has a substantially cylindrical shaft shape and externally fit on the second buffer member, the movable member is supported on the projection via the second buffer member without contacting the projection and the another end of the drive chassis, both side portions of the one end of the drive chassis is attached to the frame via the first buffer members, the guide of the frame extends vertically and assists a vertical movement of the movable member as the movable member is guided along the cam groove of the cam plate, and the motor is disposed on a portion of the frame so as to opposed to a side portion of the drive chassis that corresponds to a position on the disk tray in which the rack is disposed.

DETAILED DESCRIPTION OF THE PREFERRED EMBODIMENTS

Figure 1:
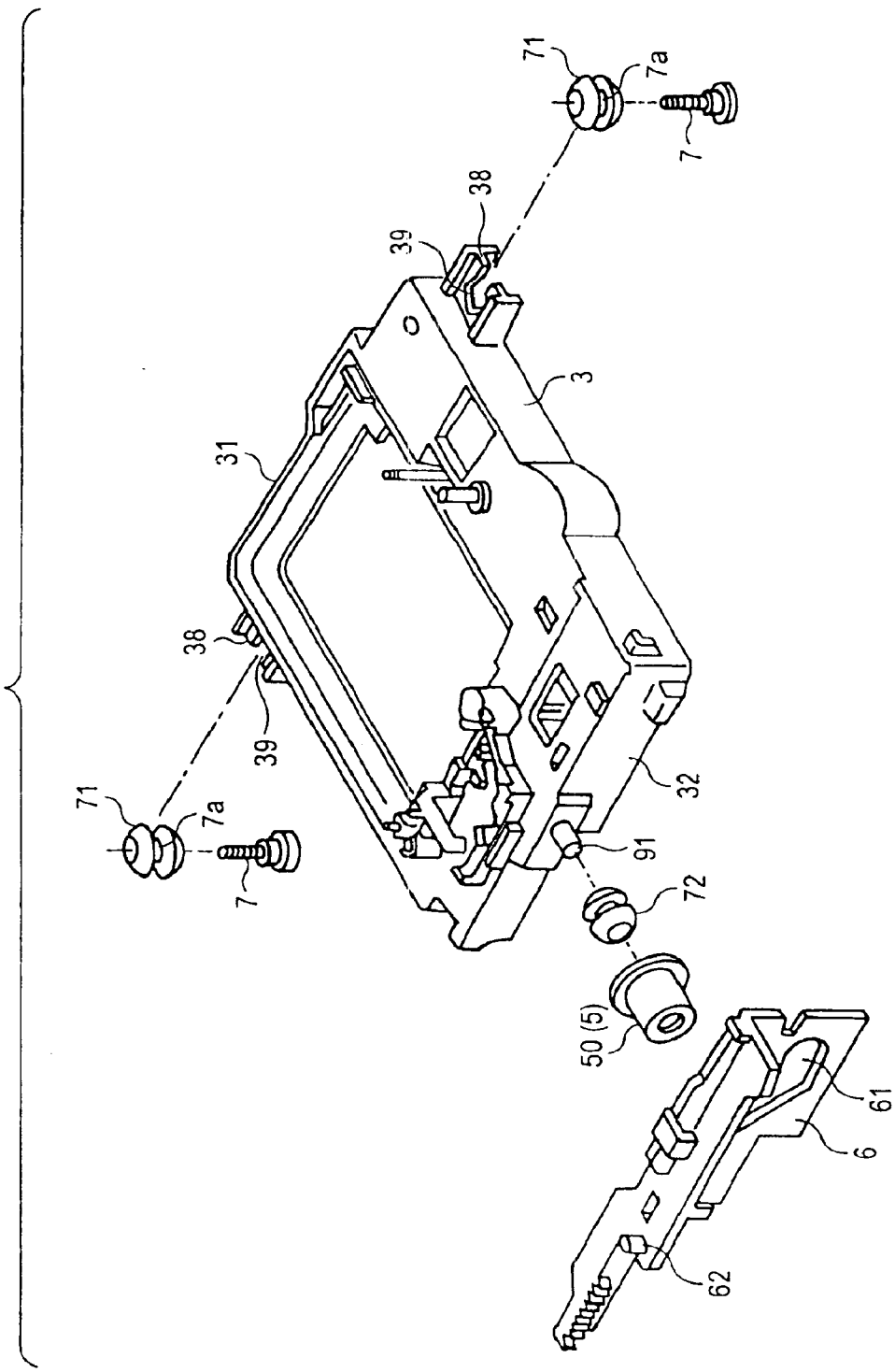
FIG. 1 is a schematic exploded perspective view showing a drive chassis and so forth used for an embodiment of the present invention.
Figure 2:
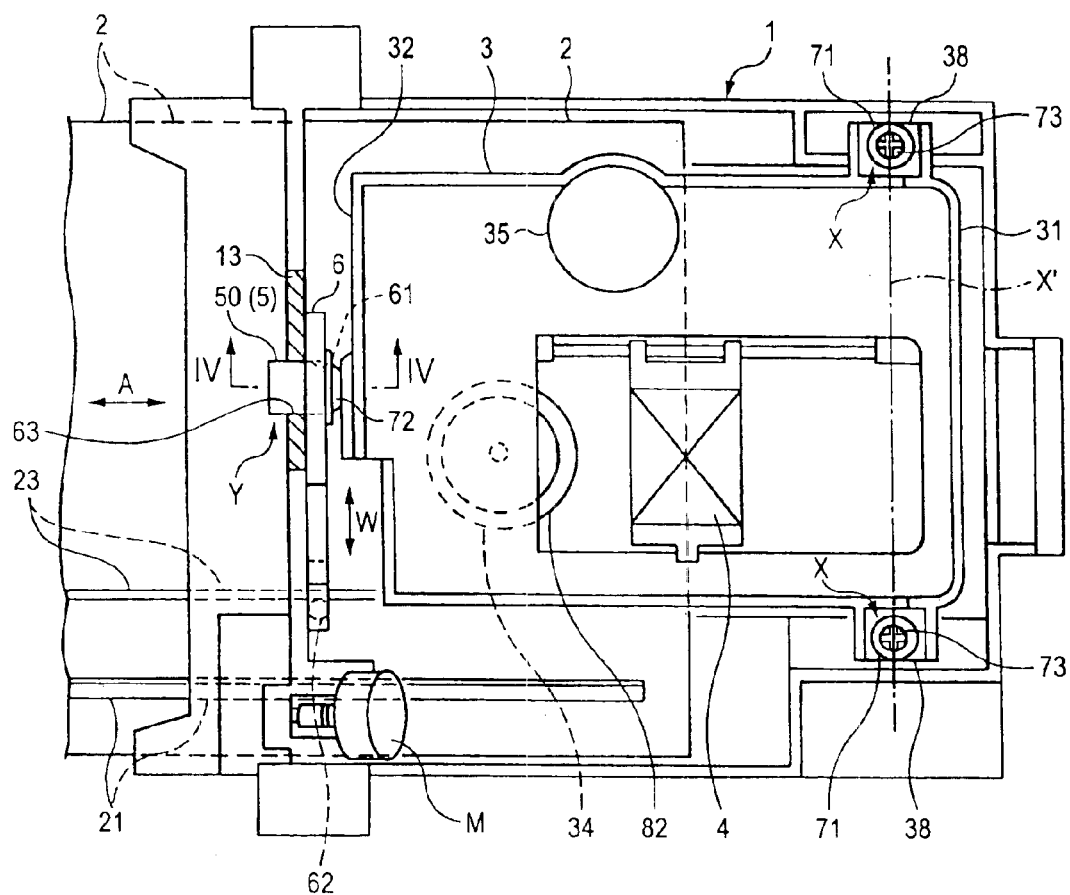
FIG. 2 is a schematic bottom view showing a portion of the embodiment.
Figure 3:
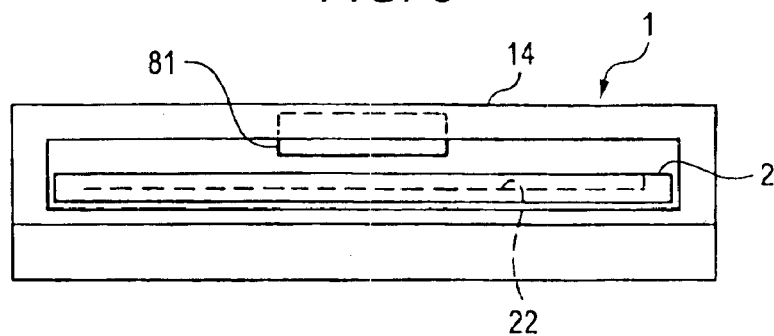
FIG. 3 is a schematic explanatory front view showing the same embodiment.
Figure 4:
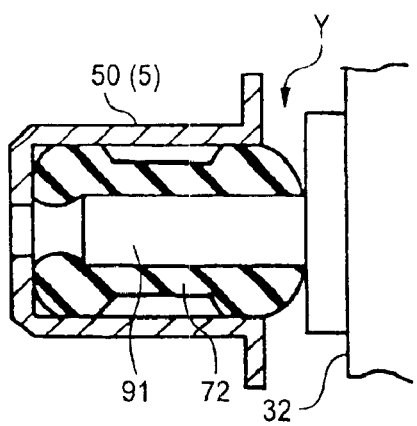
FIG. 4 is an enlarged sectional view taken along a line IV—IV in FIG. 2.
Figure 5:
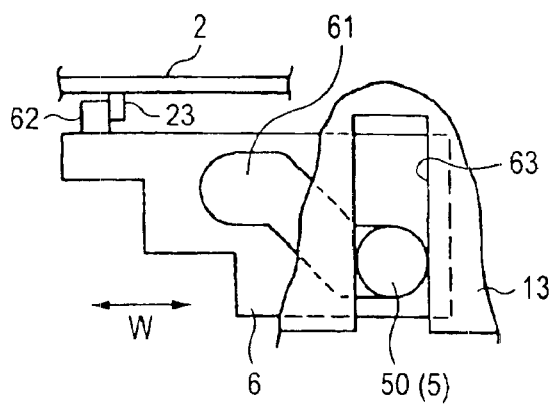
FIG. 5 is a partially cutaway front view showing the shape of a cam hole.
Figure 6:
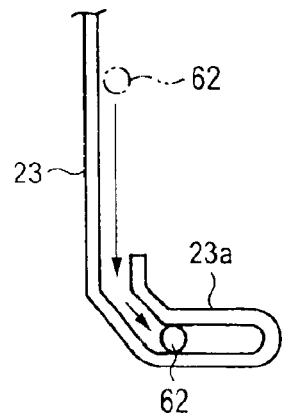
FIG. 6 is an explanatory drawing showing a portion of a guide rib.

FIG. 1 is a schematic exploded view in perspective showing a drive chassis 3, a movable member 5, a cam plate 6 and so forth used in an embodiment of the disk apparatus according to the present invention, FIG. 2 is a schematic explanatory bottom view of a portion of the disk apparatus, FIG. 3 is a schematic explanatory drawing taken from the front side of the disk apparatus, FIG. 4 is an enlarged sectional view of a portion of the disk apparatus taken along a line IV—IV in FIG. 2, FIG. 5 is a partially cutaway front view showing the shape of a cam hole and so forth, and FIG. 6 is an explanatory drawing showing a portion of a guide rib 23. In the following description, the parts identical with or equivalent to those described with reference to FIG. 7 and FIG. 8 shall be designated by the same reference numerals in order to have the present invention and the related art example understood comparatively with ease.

As shown in FIG. 2, a frame is formed into a rectangular shape. As shown in FIG. 3, a beam portion 14 is provided in a laterally extending state at an upper section of the frame 1. Under this beam portion 14, a disk tray 2 is provided so that the disk tray 2 can be moved in the disk inserting and withdrawing direction (the direction of an arrow A in FIG. 2, i.e. the longitudinal direction) with respect to the frame 1. As shown in FIG. 3, the disk tray 2 is provided in an upper surface thereof with a circular recessed disk setting portion 22, and a disk placed in the disk setting portion is moved in the direction of the arrow A of the disk tray 2 and thereby inserted into and withdrawn from a setting position in a substantially central portion of the frame 1.

As shown in FIG. 2, the drive chassis 3 formed of a molded body of a synthetic resin is provided on the lower side of the disk tray 2. The drive chassis 3 is provided thereon with a disk scanning optical pickup 4 capable of being moved forward and backward in the longitudinal direction, a motor 35 for moving the optical pickup forward and backward, a motor 34 for rotationally driving a turntable 82 as a disk pressing member which will be described later. The drive chassis 3 is provided at the left and right sides of one longitudinal end portion 31 thereof with attaching members 38, 38, which are attached to the frame 1. The drive chassis 3 is adapted to be swung around a one-dot chain line X' in the vertical direction at a free end 32 which is on the opposite side of the mentioned end portion with portions X, X used as fulcrums, at which the attaching members 38, 38 and frame 1 are joined to each other. On the other hand, a shaft member 50 as a movable member 5 is joined to a substantially widthwise central portion of the free end 32 of the drive chassis 3. A portion of the frame 1 at which a joint section of the free end 32 of the drive chassis 3 is connected to the movable member 5 is shown by a reference letter Y.

A cam plate 6 is attached slidably in the lateral direction W to a front plate portion 13 of the frame 1, and the shaft member 50 is engaged slidably with a cam hole 61 provided in this cam plate 6. When the cam plate 16 is slid in the lateral direction W, the shaft member 50 guided by the cam hole 61 is swung up and down with the free end 32 of the drive chassis 3 around the one-dot chain line X' with the attaching portions X, X used as fulcrums, at which the first-mentioned longitudinal end portion 31 of the drive chassis 3 is attached to the shaft member 50, as is understood from FIGS. 1, 2 and 5. In this embodiment, a vertically extending guide groove 63 for assisting the shaft member 50 to move in the vertical direction as shown in FIG. 5 is provided in the front plate portion 13 of the frame 1 on which the cam plate 6 is superposed slidably.

As shown in FIG. 2 and FIG. 5, the disk tray 2 is provided with a guide rib 23 extending in the direction in which the disk tray 2 is inserted into and withdrawn from the frame, and a projection 62 provided on the cam plate 6 is slidably engaged with the guide rib 23. As shown in FIG. 6, the guide rib 23 is bent at a front end portion thereof toward the side of a widthwise center of the disk tray 2. When the disk 2 fully withdrawn into the frame 1, a bent portion 23a of the guide rib 23 guides the projection 62 toward the side of the widthwise center of the disk tray 2 to cause the projection 62 to be engaged with the bent portion 23a and thereby the disk tray 2 is locked up in a disk setting position. Furthermore, a mechanism (not shown) is provided which is adapted to slidingly move the shaft member 50 engaged with the cam hole 61, in the upward direction by slidingly moving the cam plate 6 when the disk tray is fully withdrawn into the frame 1. When the shaft member 50 is moved up in accordance with a sliding movement of the cam plate 6, the free end 32 of the drive chassis 3 is swung with the shaft member 50 in the upward direction around the one-dot chain line X' shown in FIG. 1. The disk tray 2 has at one lateral side portion thereof a rack 21 which is meshed with a gear (not shown) rotationally driven by a motor M, and which is used to move the disk tray 2 in the disk inserting and withdrawing direction.

The disk tray 2 is provided with an opening (not shown) which allows the passage therethrough of a disk pressing member of a chucking mechanism 8 which will be described later, and the above-mentioned guide rib 23 and rack 21 are positioned on one side of this opening. Since the motor M is provided on the portion of the frame 1 which is adjacent to one side of the drive chassis 3 as shown in FIG. 2, a distance between the motor M and the rack 21 on the disk tray 2 is set as short as possible. Accordingly, the number of the gears in a gear train (not shown) for transmitting the rotation of the motor M to the rack 21 is reduced to a level lower than that of the related art disk apparatus, and the construction of the gear train is simplified.

In the disk apparatus of this construction, the drive chassis 3 is swung at the free end 32 thereof in the vertical direction so as to lift the disk carried in to a disk setting position by the disk tray 2, and have the resultant disk grasped by the chucking mechanism 8. The disk thus grasped by the chucking mechanism 8 is rotated with the chucking mechanism 8, and the optical pickup 4 is moved in the radial direction with respect to the rotating disk to carry out a scanning operation.

The chucking mechanism 8 includes a circular plate 81 (refer to FIG. 3) as a receiving member held rotatably on the beam portion 14 at an upper section of the frame 1, and a turntable 82 (Refer to FIG. 2) as a disk pressing member adapted to lift the disk and mounted on the disk tray 2. The disk pressing member presses the disk against the circular plate 81 in the disk setting position. The circular plate 81 and turntable 82 are arranged separately in a position above the disk tray 2 and in a position below the disk tray 2 respectively. The turntable 82 is connected directly to a rotary shaft of the motor 34 and provided in this condition on the drive chassis 3. When the disk is grasped by the chucking mechanism 8 in the disk setting position as mentioned above, the turntable 82 as a disk pressing member of the chucking mechanism 8 passes through the opening of the disk tray 2 and approaches to the receiving member 81.

In this disk apparatus, first buffer members 71 are provided in the attaching portions X of the drive chassis 3 with respect to the frame 1, and a second buffer member 72 in a joint portion Y of the drive chassis in which the drive chassis 3 and the shaft member 50 as a movable member 5 are connected together, so as to prevent an impact from being transmitted from the frame 1 and movable member 5 to the drive chassis 3 provided with the optical pickup 4. This arrangement will further be described with reference to FIG. 1.

Figure 7:
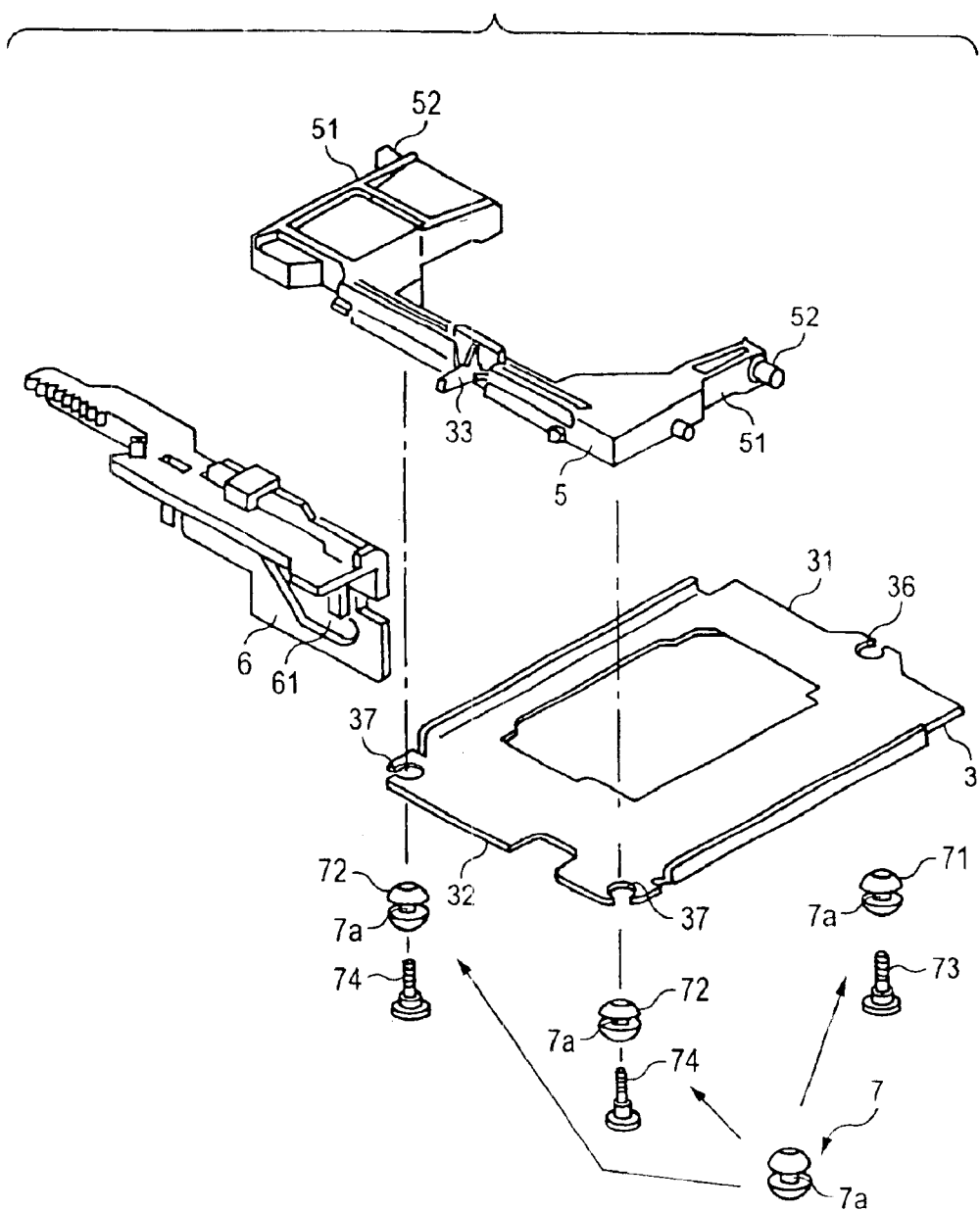
FIG. 7 is a schematic exploded view in perspective showing a drive chassis and so forth used in a related art disk apparatus.
Figure 8:
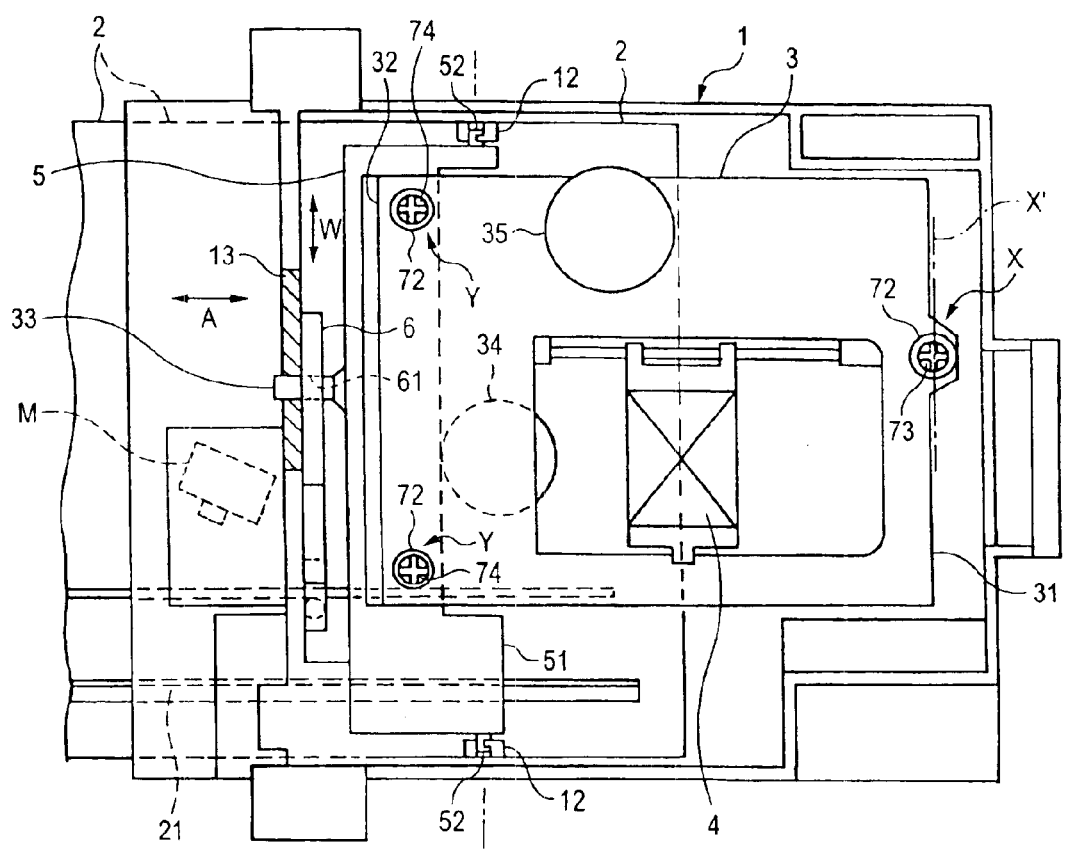
FIG. 8 is a schematic bottom view explanatorily showing a portion of the related art disk apparatus.

The first buffer members 71 and second buffer member 72 shown in FIG. 1 are formed of a cylindrical member 7 made of soft vibration-proof rubber described with reference to FIG. 7. In the attaching portions X, X of the drive chassis 1 with respect to the frame 1, the two first buffer members 71, 71 are attached at their respective annular grooves 7a, 7a in non-closed holes 39, 39 of two attaching members 38, 38 provided on left and right sides of the first-mentioned end portion 31 of the drive chassis 3, and these buffer members are thereby held separately on the left and right fixing members 38, 38 of the drive chassis 3. Fixing screws 7 inserted through the first buffer members 71, 71 from the lower side thereof are driven into threaded holes (not shown) made in the frame 1 shown in FIG. 2. When the first-mentioned end portion 31 of the drive chassis 3 is thus attached to the frame 1, the free end 32 of the drive chassis 3 becomes able to be swung around the one-dot chain line X' with the attaching portions X, X used as fulcrums through the deformation of the first buffer members 71, 71. On the other hand, in the joint portion Y at which the shaft member 50 and the free end 32 of the drive chassis 3 are connected together, the shaft member 50 made of a hollow cylindrical cap-shaped molded body of a synthetic resin is fitted around a projection 91 extending from one substantially widthwise central portion of the free end 32 of the drive chassis 3 as shown in FIG. 1 and FIG. 4. Between the shaft member 50 and projection 91, a second cylindrical buffer member 72 fitted around the projection 91 is provided in a press fitted state. The shaft member 50 is held on the projection in a non-contacting state with respect to the projection 91 and the free end 32 of the drive chassis 3 via this second buffer member 72.

When the first buffer members 71, 71 made of vibration-proof rubber are provided in the attaching portions X, X of the drive chassis 3 with respect to the frame 1 with the second buffer member 72 of vibration-proof rubber provided in the joint portion Y between the shaft member 50 and the free end 32 of the drive chassis 3, an impact occurring on the frame 1 and movable member 5 is absorbed in the first buffer members 71 and second buffer member 72, and hardly transmitted to the drive chassis 3. Therefore, deterioration in the disk scanning capability of the optical pickup can be prevented.

In this embodiment, the drive chassis 3 is attached at two sections of one longitudinal end portion thereof to the frame 1, and the vertical movements of the single shaft member 50 are assisted by the guide groove 63. Therefore, the lateral deflection of the free end 32 of the drive chassis 3 does not occur during a vertical swinging movement of the drive chassis 3 even though the first buffer members 71, 71 made of flexible vibration-proof rubber are provided in the attaching portions X, X.

In the disk apparatus according to the present invention described above, a movable member for swinging the free end of the drive chassis is made of a shaft member. Therefore, the dimensions of the movable member are reduced as compared with a movable member, which is made of a lift lever, of a related art disk apparatus, so that the cost of manufacturing the disk apparatus according to the present invention becomes easy to be reduced greatly. Since the movable member is made of a shaft member, spaces at the left and right sides of the free end of the drive chassis become able to be utilized as spaces for installing a motor therein. This enables a distance between the motor and a rack of the disk tray to be reduced, the construction of a gear train to be simplified, and the disk apparatus manufacturing cost to be reduced. Moreover, according to the present invention, first or second buffer member made of vibration-proof rubber is provided in attaching portions of the drive chassis with respect to the frame and joint portion of the drive chassis with respect to the movable member. Therefore, an impact imparted to the frame and movable member is absorbed in these buffer members and hardly transmitted to the drive chassis. This serves to prevent deterioration in the scanning performance of an optical pickup provided on the drive chassis.

What is claimed is:

1. A disk apparatus comprising:

a frame having a guide;

a motor;

a disk tray adapted to be driven by the motor and carried into and out from the frame, the disk tray having an opening and a rack disposed on one side of the opening and meshed with a gear driven by the motor;

a chucking mechanism adapted to grasp a disk carried into the frame by the disk tray, the chucking mechanism having a disk receiving member and a disk pressing member adapted to lift the disk set on the disk tray and press the disk against the receiving member;

first buffer members made of vibration-proof rubber;

a drive chassis disposed below the disk tray, the drive chassis having one end attached to the frame via the first buffer members and another end being swingable in vertical directions around the one end serving as a fulcrum, the drive chassis having a projection projecting from the another end;

a disk scanning optical pickup disposed on the drive chassis;

a cam plate having a cam groove, the cam plate being movable in lateral directions at a position facing the another end;

a second buffer member made of vibration-proof rubber and pressingly fit on the projection of the drive chassis; and a movable member attached to the another end via the second buffer member, the movable member adapted to be moved vertically as the movable member is guided along the cam groove, wherein the disk pressing member is disposed on the drive chassis and is passable to the opening of the disk tray, the movable member has a substantially cylindrical shaft shape and externally fits on the second buffer member, the movable member is supported on the projection via the second buffer member without contacting the projection and the another end of the drive chassis, both side portions of the one end of the drive chassis are attached to the frame via the first buffer members, the guide of the frame extends vertically and assists a vertical movement of the movable member as the movable member is guided along the cam groove of the cam plate, and the motor is disposed on a portion of the frame so as to be opposed to a side portion of the drive chassis that corresponds to a position on the disk tray in which the rack is disposed.

2. A disk apparatus comprising:

a frame;

a disk tray adapted to be driven by a motor and carried into and out from the frame;

a chucking mechanism adapted to grasp a disk carried into the frame by the disk tray, the chucking mechanism having a disk receiving member and a disk pressing member adapted to lift the disk set on the disk tray and press the disk against the receiving member;

two first buffer members;

a drive chassis disposed below the disk tray, the drive chassis having one end attached to the frame via the first buffer member and another end being swingable in vertical directions around the one end serving as a fulcrum;

a cam plate having a cam groove, the cam plate being movable in lateral directions at a position facing the another end;

a second buffer member; and a movable member attached to the another end via the second buffer member, the movable member adapted to be moved vertically as the movable member is guided along the cam groove, wherein the disk pressing member is disposed on the drive chassis, and the movable member has a substantially shaft shape projecting from the another end of the drive chassis and engaged slidably with the cam groove.

3. A disk apparatus according to claim 2, wherein the movable member has a substantially hollow cylindrical shaft shape and is externally fitted around the second buffer member, the second buffer member is formed into a cylindrical shape, and externally and pressingly fitted around a projection extending from the another end of the drive chassis, and is interposed between the movable body and the projection, and the movable member is supported in a non-contacting state with respect to the projection and the another end of the drive chassis on the projection via the second buffer member.

4. A disk apparatus according to claim 2, wherein the one end of the drive chassis is attached at both of the opposed widthwise end sections thereof to the frame via the first buffer members, and the frame has a vertically extending guide for assisting a vertical movement of the movable member as the movable member is guided by the cam groove of the cam plate.

5. A disk apparatus according to claim 2, wherein the disk tray has an opening and a rack disposed on one side of the opening and meshed with a gear driven by the motor and thereby moves the disk tray along a direction in which the disk is carried in to and out from a disk setting position, and the motor is disposed on a portion of the frame so as to be opposed to a side portion of the drive chassis that corresponds to a position on the disk tray in which the rack is disposed.

* * * * *